US010746869B2

(12) United States Patent
 Shin

(10) Patent No.: US 10,746,869 B2
(45) Date of Patent: Aug. 18, 2020

(54) METHOD AND APPARATUS FOR COMPENSATING ANTENNA GAIN PATTERN

(71) Applicant: Korea Aerospace Research Institute, Daejeon (KR)

(72) Inventor: Jae Min Shin, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 164 days.

(21) Appl. No.: 16/011,144

(22) Filed: Jun. 18, 2018

(65) Prior Publication Data

US 2018/0372863 A1   Dec. 27, 2018

(30) Foreign Application Priority Data

Jun. 21, 2017  (KR) .................. 10 2017 0078484

(51) Int. Cl.
   *G01S 13/90*   (2006.01)
   *G01S 7/40*    (2006.01)

(52) U.S. Cl.
   CPC ........ *G01S 13/9005* (2013.01); *G01S 7/4026* (2013.01); *G01S 13/90* (2013.01); *G01S 13/904* (2019.05); *G01S 13/9011* (2013.01); *G01S 13/9017* (2013.01); *G01S 13/9064* (2019.05); *G01S 2007/4034* (2013.01)

(58) Field of Classification Search
   CPC ............. G01S 13/9005; G01S 13/9011; G01S 13/9017; G01S 13/904; G01S 13/90; G01S 7/4026; G01S 13/9064; G01S 2007/4034
   USPC ........... 342/165, 25 R; 375/147, 343; 348/47
   See application file for complete search history.

(56) References Cited

U.S. PATENT DOCUMENTS

| 8,427,358 B1 | 4/2013 | Doerry | |
|---|---|---|---|
| 2007/0268960 A1* | 11/2007 | Jia | ............................ G01S 19/28 375/147 |
| 2012/0105274 A1* | 5/2012 | Andersson | .............. G01S 13/90 342/25 A |
| 2013/0124079 A1 | 5/2013 | Olivier et al. | |
| 2013/0135443 A1 | 5/2013 | Martinerie et al. | |

(Continued)

FOREIGN PATENT DOCUMENTS

| EP | 2 065 731 A1 | 6/2009 |
|---|---|---|
| JP | 2017003553 A | 1/2017 |
| KR | 101058773 B1 | 8/2011 |

OTHER PUBLICATIONS

Study on the Improvement of Radiometric Accuracy using the Effective Gain Pattern for the Spaceborne SAR System at a Wideband, 2016; 116 pages.

(Continued)

*Primary Examiner* — Vladimir Magloire
*Assistant Examiner* — Monark Sharma
(74) *Attorney, Agent, or Firm* — Sandberg Phoenix & von Gontard, P.C.

(57) ABSTRACT

Disclosed is a calibration method of performing dual radiometric compensation by using an antenna gain pattern of a synthetic aperture radar (SAR) both in a time domain and in a frequency domain. The method may include performing frequency-domain radiometric compensation in relation to an elevation angle and performing time-domain radiometric compensation in relation to a frequency to calibrate the antenna gain pattern.

10 Claims, 9 Drawing Sheets

(56) References Cited

U.S. PATENT DOCUMENTS

2014/0278082 A1 9/2014 De Vries et al.
2017/0016979 A1* 1/2017 Cho ....................... G01S 13/90

OTHER PUBLICATIONS

Study on the Improvement of Radiometric Accuracy using the Effective Gain Pattern for the Spaceborne SAR System at a Wideband, Presentation material, May 24, 2015; 36 pages.

* cited by examiner

METHOD AND APPARATUS FOR COMPENSATING ANTENNA GAIN PATTERN

CROSS-REFERENCE TO RELATED APPLICATION(S)

This application claims the priority benefit of Korean Patent Application No. 10-2017-0078484 filed on Jun. 21, 2017, in the Korean Intellectual Property Office, the disclosure of which is incorporated herein by reference for all purposes.

BACKGROUND

1. Field

One or more example embodiments relate to a method and apparatus to improve a quality of a satellite imagery, and more particularly, to a method and apparatus to improve a radiometric quality of a satellite imagery by compensating an antenna gain pattern of a synthetic aperture radar (SAR).

2. Description of Related Art

An existing imaging radar satellite has been developed as a narrowband system with a bandwidth of less than 300 megahertz (MHz). Thus, relative radiometric calibration can be performed to compensate an antenna radiometric gain pattern when designing an antenna model based on a single center frequency, and obtain a uniform variation in brightness of a synthetic aperture radar (SAR) image by applying the established antenna model.

In a case of an SAR with a narrow bandwidth of less than 300 MHz, an inverse function of an antenna radiometric gain pattern based on a single center frequency can be applied to compensate for a radiometric error relatively simply. However, in a case of a wideband system with a bandwidth of 300 MHz or greater, a radiometric gain pattern may change based on varying frequencies, and thus changed magnitude values obtained as a center of the radiometric gain pattern moves may be synthesized within a wideband frequency of a signal and applied complexly to the system.

SUMMARY

According to an example embodiment, there is provided a method of compensating an antenna gain pattern to be at least temporarily implemented by a computer, the method including performing frequency-domain compensation on an antenna gain pattern of a first frequency band.

The performing of the frequency-domain compensation may include multiplying a frequency-domain signal by a function in which a first elevation angle variation in a time domain is applied to antenna gain values in a frequency domain.

The function in which the first elevation angle variation in the time domain is applied to the antenna gain values in the frequency domain may be an inverse function of a function obtained by multiplying an antenna gain function in the frequency domain by a weighting function in the time domain and performing an integration on a function obtained by the multiplying, in a system bandwidth.

According to another example embodiment, there is provided a method of compensating an antenna gain pattern to be at least temporarily implemented by a computer, the method including performing frequency-domain compensation on an antenna gain pattern of a first frequency band, and performing time-domain compensation on the antenna gain pattern.

The performing of the frequency-domain compensation may include multiplying a frequency-domain signal by a function in which a first elevation angle variation in a time domain is applied to antenna gain values in a frequency domain.

The performing of the time-domain compensation may include multiplying a time-domain signal by a function in which a first frequency variation in the frequency domain is applied to antenna gain values in the time domain.

The function in which the first elevation angle variation in the time domain is applied to the antenna gain values in the frequency domain may be an inverse function of a function obtained by multiplying an antenna gain function in the frequency domain by a weighting function in the time domain and performing an integration on a function obtained by the multiplying, in a system bandwidth.

The function in which the first frequency variation in the frequency domain is applied to the antenna gain values in the time domain may be an inverse function of a function obtained by multiplying an antenna gain function in the time domain by a weighting function in the frequency domain and performing an integration on a function obtained by the multiplying, in the system bandwidth.

According to still another example embodiment, there is provided an apparatus for compensating an antenna gain pattern to be at least temporarily implemented by a computer, the apparatus including a processor configured to perform frequency-domain compensation on an antenna gain pattern of a first frequency band.

The processor may be further configured to perform the frequency-domain compensation by multiplying a frequency-domain signal by a function in which a first elevation angle variation in a time domain is applied to antenna gain values in a frequency domain.

The function in which the first elevation angle variation is applied to the antenna gain values in the frequency domain may be an inverse function of a function obtained by multiplying an antenna gain function in the frequency domain by a weighting function in the time domain and performing an integration on a function obtained by the multiplying, in a system bandwidth.

According to yet another example embodiment, there is provided an apparatus for compensating an antenna gain pattern to be at least temporarily implemented by a computer, the apparatus including a processor configured to perform frequency-domain compensation on an antenna gain pattern of a first frequency band, and perform time-domain compensation on the antenna gain pattern.

The processor may be further configured to perform the frequency-domain compensation by multiplying a frequency-domain signal by a function in which a first elevation angle variation in a time domain is applied to antenna gain values in a frequency domain.

The processor may be further configured to perform the time-domain compensation by multiplying a time-domain signal by a function in which a first frequency variation in the frequency domain is applied to antenna gain values in the time domain. The function in which the first elevation angle variation in the time domain is applied to the antenna gain values in the frequency domain may be an inverse function of a function obtained by multiplying an antenna gain function in the frequency domain by a weighting function in the time domain and performing an integration on a function obtained by the multiplying, in a system bandwidth. In detail, the processor may be further configured to perform an inverse Fourier transform (IFT) on a multiplication of a frequency-domain signal of a received signal sequence by a transmitted-modulated signal sequence and a frequency-domain signal of a complex conjugate replica signal of a transmitted-modulated signal sequence, along with a frequency-domain inverse function of the antenna gain pattern in the system bandwidth, and multiply a result obtained by the IFT by a time-domain inverse function of the antenna gain pattern in the system bandwidth, such that the first frequency variation and the first elevation angle variation are applied.

The function in which the first frequency variation in the frequency domain is applied to the antenna gain values in the time domain may be an inverse function of a function obtained by multiplying an antenna gain function in the time domain by a weighting function in the frequency domain and performing an integration on a function obtained by the multiplying, in the system bandwidth.

The first frequency band may be 9.2 gigahertz (GHz) or greater to 10.4 GHz or less.

According to further another example embodiment, there is provided a non-transitory computer-readable storage medium storing instructions that, when executed by a processor, cause the processor to perform the method of compensating an antenna gain pattern.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
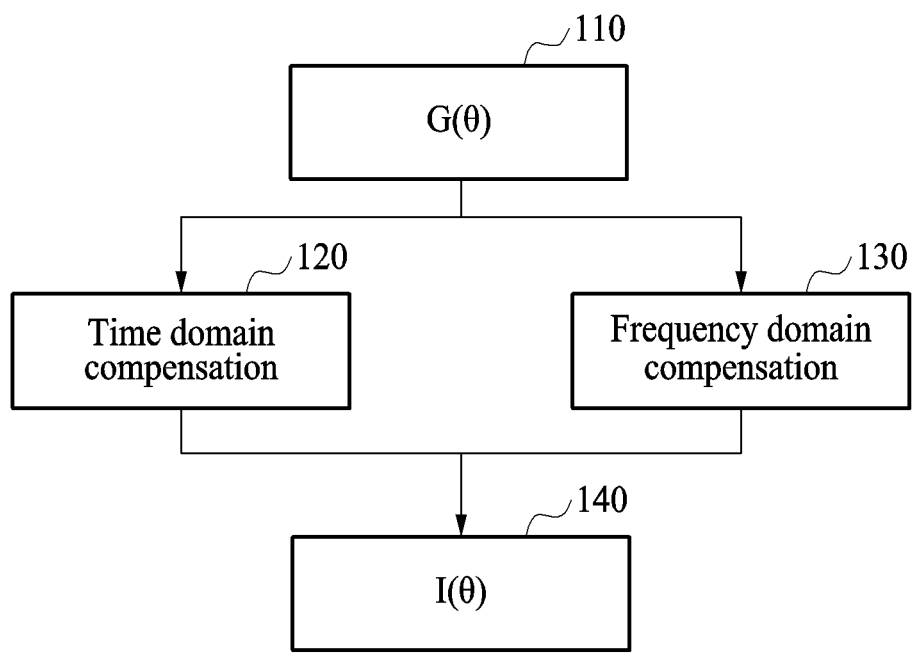
FIG. 1 is a diagram illustrating an example of a method of compensating an antenna gain pattern according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to limit the present disclosure. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 3:
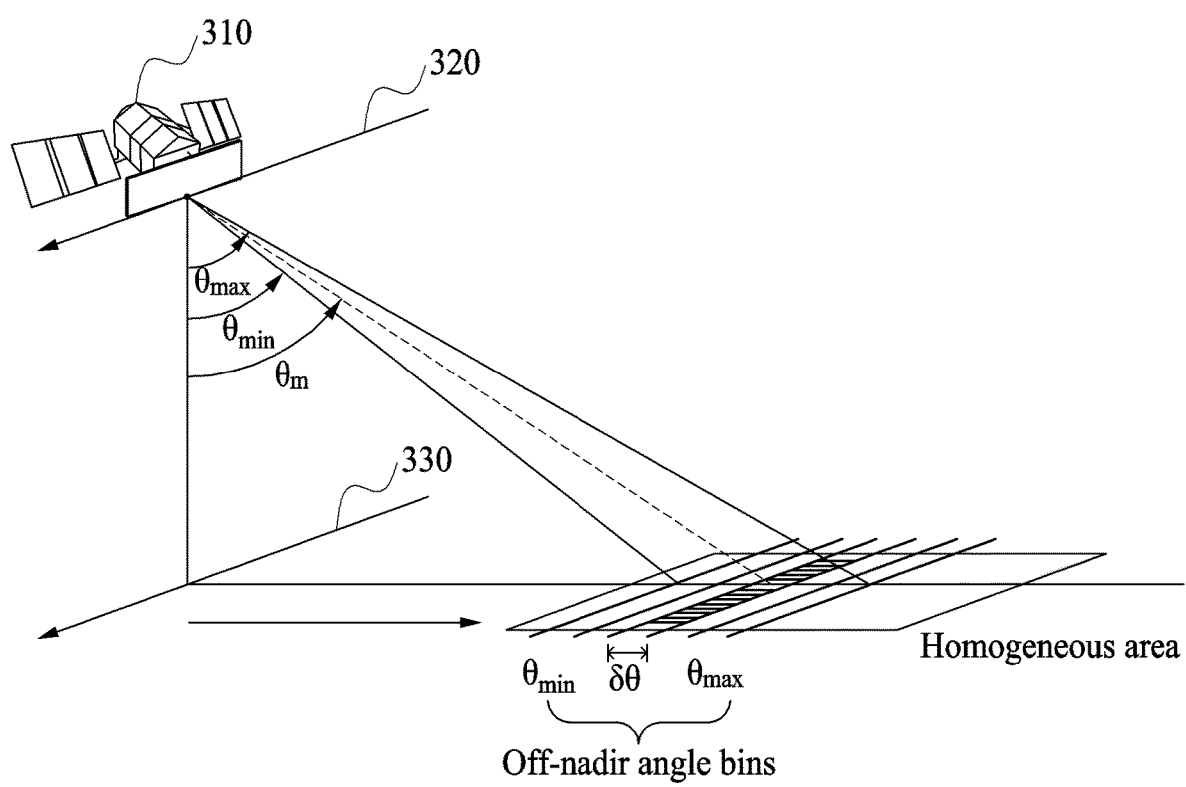
FIG. 3 is a diagram illustrating an example of a radiation area based on a variation in elevation angle according to an example embodiment.

When same target objects are present in an image, a same magnitude of response may need to be maintained to use image radar data. Since an antenna radiometric gain pattern of a synthetic aperture radar (SAR), for example, $g^2(\theta)=g_T(\theta)g_R(\theta)$, changes in its magnitude depending on an incidence angle $\theta$, a compensation process of applying an inverse function $g_T^{-1}(\theta)g_R^{-1}(\theta)$ may be required. In such a case, the compensation process may be performed on the assumption that $g^2(\theta)$ applied in a relative radiometric calibration process accurately reflects a characteristic of an SAR system and does not change. Thus, in a case in which a frequency response characteristic does not change or changes insignificantly based on a bandwidth of the system, hereinafter also referred to as a system bandwidth, radiometric compensation may be performed by applying only a change based on $\theta_{mm}$, $\theta_m$, and $\theta_{max}$ to $g_T^{-1}(\theta)g_R^{-1}(\theta)$, as illustrated in FIG. 3.

On the assumption that an ideal single radiation pattern is exhibited when a frequency variation $\Delta f$ relative to a center frequency $f_c$ is less than $\pm 150$ megahertz (MHz), simple relative radiometric compensation using $g_T^{-1}(\theta)g_R^{-1}(\theta) = g_{con.}^{-2}(\theta_W, f_c)_{time}$ in a time domain may be performed, as represented by Equation 1.

$$I_{ideal}^{IRF}(\theta_W)_{f=f_{BW}} \cong g_{con.}^{-2}(\theta_W, f_c)_{time} \cdot J^{-1}[S_{Rx}(f) \cdot H_{Tx}^{ra}(f)] \quad \text{[Equation 1]}$$

In a case of an existing narrow bandwidth, $g_{con.}^{-2}(\theta_W, f_c)_{time}$ denotes an antenna gain pattern in a time domain in an entire elevation angle range $\theta_W$, which indicates $g_T^{-1}(\theta)g_R^{-1}(\theta)$ at the center frequency $f_c$. $J^{-1}$ denotes an inverse Fourier transform (IFT), and $S_{Rx}(f)$ denotes a frequency-domain signal of a received signal sequence $S_{Rx}(t)$ by a transmitted-modulated signal sequence $S_{mPT}(t)$. $H_{Tx}^{ra}(f)$ denotes a range component of a frequency-domain signal of a complex conjugate replica signal of the transmitted-modulated signal sequence $S_{mPT}(t)$. However, a range that is highly dependent on a radiometric quality, rather than orientations and two-dimensional ranges, may only be considered for analytical convenience. That is, an ideal synthetic aperture signal $I_{ideal}^{IRF}(\theta_W)$ obtained through radiometric calibration may be a value obtained by multiplying the frequency-domain signal of the received signal sequence of the transmitted-modulated signal sequence and the range component of the frequency-domain signal of the complex conjugate replica signal of the transmitted-modulated signal sequence, performing an IFT on a value obtained by the multiplying, and then multiplying the antenna gain pattern in the time domain by a value obtained by the IFT.

However, in a case in which a frequency variation $\Delta f$ relative to the center frequency $f_c$ is greater than or equal to $\pm 300$ MHz, a great error may occur when the existing simple relative radiometric compensation is performed based on the single center frequency $f_c$ as represented by Equation 1 above. Thus, provided herein are a method of performing frequency-domain compensation to improve accuracy in radiometric calibration, and a method of performing dual radiometric compensation through which time-domain compensation and frequency-domain compensation are performed simultaneously to improve the accuracy.

FIG. 1 is a diagram illustrating an example of a method of compensating an antenna gain pattern according to an example embodiment. The method of compensating an antenna gain pattern will be hereinafter referred to as an antenna gain pattern compensation method. Referring to FIG. 1, by performing, on an antenna gain pattern $G(\theta)$ 110, frequency-domain compensation 130 solely, or time-domain compensation 120 and the frequency-domain compensation 130 simultaneously, rather than performing existing time-domain compensation, based on a system bandwidth, an improved result image $I(\theta)$ 140 may be obtained through the suggested radiometric calibration.

The antenna gain pattern $G(\theta)$ 110 may change based on an elevation angle $\theta_W$ and a frequency $f_{BW}$ of a system. However, for various applications of the result image $I(\theta)$ 140, it may be desirable that same target objects have response characteristics of a same magnitude despite different elevation angles and frequencies. Thus, it is needed to perform the time-domain compensation 120 solely or the frequency-domain compensation 130 solely, or dual radiometric compensation through which both the time-domain compensation 120 and the frequency-domain compensation 130 are performed.

The time-domain compensation 120 may be performed solely to calibrate the antenna gain pattern $G(\theta)$ 110 by multiplying a time-domain signal by an inverse number of a time-domain antenna gain value to which a frequency characteristic is applied, in a system bandwidth. The frequency-domain compensation 130 may be performed solely to calibrate the antenna gain pattern $G(\theta)$ 110 by multiplying a frequency-domain signal by an inverse number of a frequency-domain antenna gain value to which an elevation angle variation characteristic is applied.

In detail, the preceding may be represented by Equation 2.

$$I_{ideal}^{IRF}(\theta_w)_{f=f_{BW}} \cong g_{sugg}^{-2}(\theta_w, \tilde{f}_{BW})_{time} \cdot J^{-1}\{S_{Rx}(f) \cdot H_{Tx}(f)\} \text{ or } \quad \text{[Equation 2]}$$

$$= J^{-1}[J\{g_{sugg}^{-2}(\theta_w, \tilde{f}_{BW})_{time}\} \cdot S_{Rx}(f) \cdot H_{Tx}(f)]$$

In a case of a narrowband and a wideband system, an existing radiometric calibration method using a time-domain antenna gain pattern based on a single center frequency in accordance with antenna design and manufacture may be inaccurate. Thus, time-domain single radiometric compensation based on a variation in antenna gain in a system frequency band, in lieu of the single center frequency, may be performed. That is, since $g_{con.}^{-2}(\theta_W, f_c)_{time} \neq g_{ideal}^{-2}(\theta_W, f_{BW})_{time}$, a gain variation in a frequency band $f_{BW}$ within a system bandwidth may need to be considered.

Thus, $g_{sugg.}^{-2}(\theta_W, \tilde{f}_{BW})_{time}$ in relation to an effective frequency $\tilde{f}_{BW}$ may need to be considered. The time-domain single radiometric compensation, or solely performing the time-domain compensation 120, may consider an approximate gain variation at the effective frequency $\tilde{f}_{BW}$, and thus $g_{ideal}^{-2}(\theta_W, f_{BW})_{time} \approx g_{sugg.}^{-2}(\theta_W, \tilde{f}_{BW})_{time}$. Thus, as represented by Equation 2 above, by applying, to all elevation angles $\theta_W$, a gain variation based on a frequency in a time domain, the calibration may be performed more precisely than the existing one.

When solely performing the time-domain compensation 120, a variation in all elevation angles $\theta_W$ within a beam width may be applied using $g_{sugg.}^{-2}(\theta_W, \tilde{f}_{BW})_{time}$. To configure $g_{sugg.}^{-2}(\theta_W, \tilde{f}_{BW})_{time}$, it may be required to project an effect of a gain variation in $f_{BW}$ to the time domain. To this end, a time-domain effective gain pattern may be defined by $g_{eff}^2(\theta) = g_{sugg.}^2(\tilde{\theta}_W, \tilde{f}_{BW})_{time}$. The time-domain effective gain pattern may be represented by Equation 3, but not limited thereto.

$$g_{eff}^2(\tilde{\theta}_w)_{f=\tilde{f}_w} \cong \int_{-\frac{f_{BW}}{2}}^{\frac{f_{BW}}{2}} g_T(\tilde{\theta}_w, f) \cdot g_R(\tilde{\theta}_w, f) \cdot W_f(\tilde{\theta}_w, f) df \quad \text{[Equation 3]}$$

Hereinafter, the time-domain effective gain pattern may use a value obtained by performing an integration on an antenna gain pattern in a bandwidth interval based on a weighting function W(f) in a system bandwidth.

By solely performing the time-domain compensation 120 in such a described manner, the result image I(θ) 140 that is radiometrically calibrated may be obtained. That is, by using a time-domain single pattern to which a frequency-domain gain variation is applied, an SAR image may be calibrated.

Hereinafter, frequency-domain single radiometric compensation, or solely performing the frequency-domain compensation 130, which may be represented by Equation 4, will be described.

$$I_{sugg}^{IRF}(\theta_w)_{f=f_{BW}} \cong J^{-1}\{G_{sugg}^{-2}(\tilde{\theta}_w, f_{BW})_{freq} \cdot S_{Rx}(f) \cdot \quad \text{[Equation 4]}$$
$$H_{Tx}(f)\} \text{ or}$$
$$= J^{-1}\{G_{sugg}^{-2}(\tilde{\theta}_w, f_{BW})_{freq}\} \cdot$$
$$s_{Rx}(t) \cdot h_{Tx}(t)$$

In a case of a narrowband system and a wideband system, for example, with a bandwidth of 300 MHz or greater, a gain variation in an entire frequency bandwidth may be important. Thus, compensating for a gain variation in relation to a single center frequency may not be sufficient to compensate for the gain variation in the entire frequency bandwidth. That is, since $g_{con.}^{-2}(\theta_W, f_c)_{time} \neq g_{ideal}^{-2}(\theta_W, f_{BW})_{time}$, a gain variation in all frequency bands may need to be considered for the wideband system.

In a case in which a gain variation in $f_{BW}$ in a frequency domain is greater than a gain variation in $\theta_W$ in a time domain, $g_{ideal}^{-2}(\theta_W, f_{BW})_{time} \approx G_{sugg.}^{-2}(\tilde{\theta}_W, f_{BW})_{freq}$, and thus the frequency-domain compensation 130 may reflect a variation in a system frequency bandwidth f in a beam width by using $G_{sugg.}^{-2}(\tilde{\theta}_W, f_{BW})_{freq}$. To configure $G_{sugg.}^{-2}(\tilde{\theta}_W, f_{BW})_{freq}$, an effect of the gain variation in $\theta_W$ may be projected to the frequency domain. To this end, a frequency-domain effective gain pattern may be defined by $G_{eff}^2(f_{BW}) = G_{sugg.}^2(\tilde{\theta}_W, f_{BW})_{freq}$. For example, the frequency-domain effective gain pattern may be represented by Equation 5, but not limited thereto.

$$G_{eff}^2(f_{BW})_{\theta=\tilde{\theta}_w} \cong \quad \text{[Equation 5]}$$
$$\int_{-\frac{\theta_W}{2}}^{\frac{\theta_W}{2}} G_T(\theta, f_{BW}) \cdot G_R(\theta, f_{BW}) \cdot W_\theta(\theta, f_{BW}) d\theta$$

Hereinafter, the frequency-domain effective gain pattern may use a value obtained by performing an integration on an antenna gain pattern in a bandwidth interval based on a weighting function $W_0(\theta, f_{BW})$ in a system bandwidth.

By solely performing the frequency-domain compensation 130 in such a described manner, the result image I(θ) 140 that is radiometrically calibrated may be obtained. That is, by using a frequency-domain single pattern to which a time-domain gain variation is applied, an SAR image may be calibrated.

Thus, herein is provided dual compensation performed both in the frequency domain and the time domain, as represented by Equation 6.

$$I_{sugg}^{IRF}(\theta_w)_{f=f_{BW}} \cong g_{sugg}^{-2}(\tilde{\theta}_w, \tilde{f}_{BW})_{time} \cdot \quad \text{[Equation 6]}$$
$$J^{-1}\{G_{sugg}^{-2}(\tilde{\theta}_w, f_{BW})_{freq} \cdot$$
$$S_{Rx}(f) \cdot H_{Tx}(f)\} \text{ or}$$
$$= J^{-1}[G_{sugg}^{-2}(\tilde{\theta}_w, f_{BW})_{freq} \cdot$$
$$J\{g_{sugg}^{-2}(\tilde{\theta}_w, \tilde{f}_{BW})_{time} \cdot s_{Rx}(t) \cdot h_{Tx}(t)\}]$$

In a case of a wideband system, when a bandwidth increases, a gain variation in both a time domain and a frequency domain may increase due to antenna design. Thus, when the bandwidth increases, $g_{ideal}^{-2}(\theta_W, f_{BW})_{time} \approx g_{sugg.}^{-2}(\tilde{\theta}_W, \tilde{f}_{BW})_{time}$ and also $g_{ideal}^{-2}(\theta_W, f_{BW})_{time} \neq G_{sugg.}^{-2}(\tilde{\theta}_W, f_{BW})_{freq}$. Thus, a complex gain variation in the time and frequency domains may not be readily calibrated for by using a single compensation method, and thus dual compensation using an effective gain variation as shown in $g_{ideal}^{-2}(\theta_W, f_{BW})_{time} \cong g_{sugg.}^{-2}(\theta_W, \tilde{f}_{BW})_{time} \cdot J^{-1}\{G_{sugg.}^{-2}(\tilde{\theta}_W, f_{BW})_{freq}\}$ in each domain may be used.

$G_{sugg.}^{-2}(\tilde{\theta}_W, f_{BW})_{freq}$ using Equation 5 in relation to an effective elevation angle $\tilde{\theta}_W$ may be considered. Then, the frequency-domain compensation 130 including signal processing may be performed in relation to the effective elevation angle $\tilde{\theta}_W$, as represented by Equation 6. The frequency-domain compensation 130 may coarsely apply an elevation angle $\theta_c$. Thus, for accurate radiometric calibration in a wideband system, an antenna gain pattern may need to be additionally calibrated in a time domain.

In the time-domain compensation 120, $g_{sugg.}^{-2}(\theta_W, \tilde{f}_{BW})_{time}$ may be considered for an effective frequency using Equation 3. The time-domain compensation 120 including signal processing may be performed in relation to the effective frequency $\tilde{f}_{BW}$, as represented by Equation 6. As a sequential result, a gain variation in all frequencies $f_{Bw}$ in a system bandwidth and all elevation angles $\theta_W$ in a beam width may be applied in a coarse manner.

By performing both the frequency-domain compensation 130 and the time-domain compensation 120, the result image I(θ) that is radiometrically calibrated more accurately may be obtained.

Figure 2:
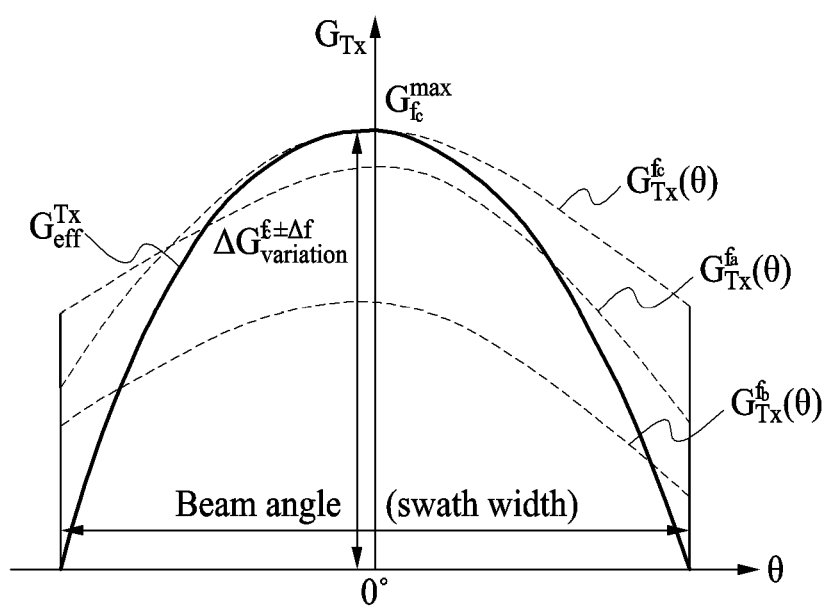
FIG. 2 is a diagram illustrating an example of a variation in antenna gain pattern based on a variation in elevation angle according to an example embodiment.

FIG. 2 is a diagram illustrating an example of a variation in antenna gain pattern based on a variation in elevation angle according to an example embodiment. In the example illustrated in FIG. 2, a variation in antenna gain pattern based on a variation in elevation angle is illustrated. In the example, an elevation angle is θ, and the variation in antenna gain pattern is indicated based on $\theta_c=0°$. In the example, a dashed-line graph shows an antenna gain pattern at each of frequencies $f_a$, $f_b$, and $f_c$. A solid-line graph shows an effective gain pattern $G_{eff}^{Tx}$, which is a complex result of antenna gains at frequencies $f_a$, $f_b$, and $f_c$. Referring to FIG. 2, at the elevation angle $\theta_c$, the antenna gains are in a sequential order starting from $f_c$, $f_a$, to $f_b$. At a minimum elevation angle $\theta_{min}$, the antenna gains are in a sequential order starting from $f_a$, $f_c$, to $f_b$. However, these are provided as examples, and a variation in antenna gain in a time domain as an elevation angle may change as a frequency changes. Conversely, a variation in antenna gain in a frequency domain may change as an elevation angle changes. Thus, in a case of a wideband system with a broad bandwidth, existing single radiometric compensation based solely on a time domain characteristic based on a center frequency may not be sufficient to accurately calibrate an antenna gain.

A variation in elevation angle θ may be a beam angle or a swath width, and a variation in antenna gain $\Delta G_{variation}^{f_c \pm \Delta f}$ may be from 0 to $G_{f_c}^{max}$.

FIG. 3 is a diagram illustrating an example of a radiation area based on a variation in elevation angle according to an example embodiment. In the example illustrated in FIG. 3, a satellite 310 and an actual orbit 320 of the satellite 310 are illustrated. In addition, a ground track 330 of the satellite 310 is illustrated. An elevation angle θ changes from $\theta_{min}$ to $\theta_{max}$ based on $\theta_c$. In the example, a homogeneous area based on a variation in elevation angle θ is also illustrated. Frequency-domain compensation may be performed based on a specific elevation angle $\theta_c$ as shown in FIG. 1. However, this is provided as an example, and the compensation may be performed based on a angle variation δθ.

Figure 4:
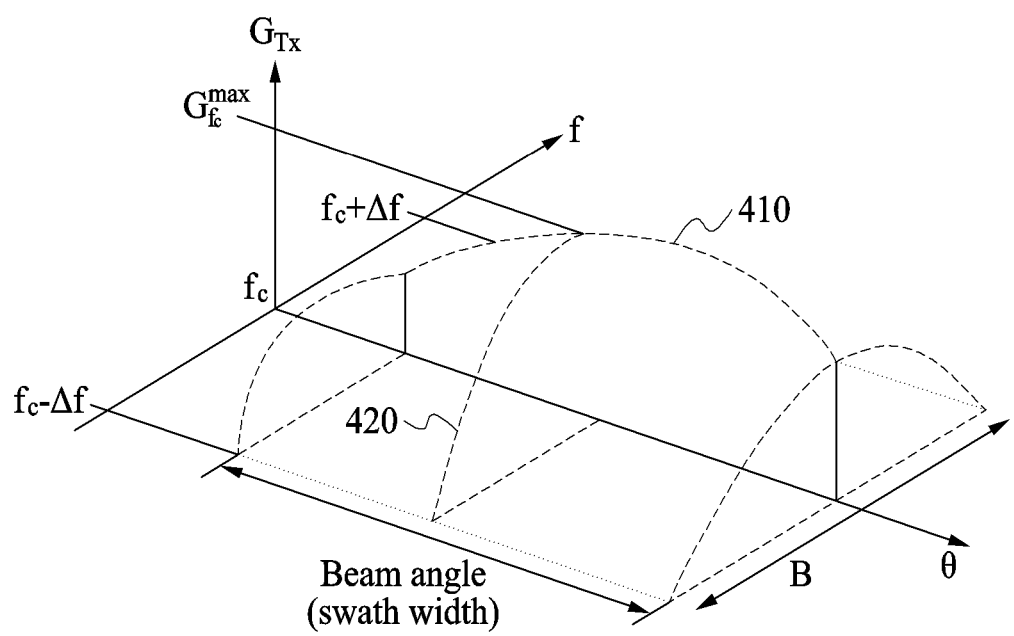
FIG. 4 is a diagram illustrating an example of an effective gain pattern based on a variation in frequency according to an example embodiment.

FIG. 4 is a diagram illustrating an example of an effective gain pattern based on a variation in frequency according to an example embodiment. In the example illustrated in FIG. 4, a time-domain effective gain pattern 410 and a frequency-domain effective gain pattern 420 are illustrated. The time-domain effective gain pattern 410 may change, in a parabolic form, based on a variation in elevation angle θ at a center frequency $f_c$. An elevation angle θ may change within a swath width and an effective gain may have a maximum value $G_{f_c}^{max}$ at an elevation angle $\theta_c$.

In addition, the frequency-domain effective gain pattern 420 may also change, in a parabolic form, based on a variation in frequency f at an elevation angle θ. A frequency f at an elevation angle θ may change from $f_c - \Delta f$ to $f_c + \Delta f$ based on the center frequency $f_c$. An effective gain pattern will be described in greater detail with reference to FIG. 5.

Figure 5:
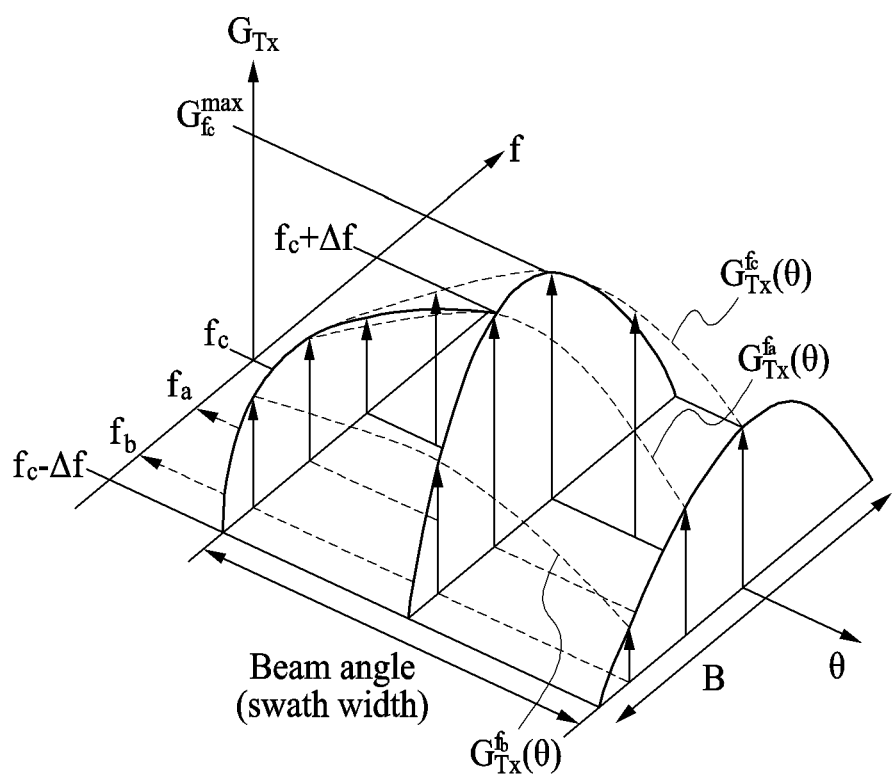
FIG. 5 is a diagram illustrating an example of an effective gain pattern based on a variation in frequency and a variation in elevation angle according to an example embodiment.

FIG. 5 is a diagram illustrating an example of an effective gain pattern based on a variation in frequency and a variation in elevation angle according to an example embodiment. In the example illustrated in FIG. 5, an effective gain pattern at each of frequencies $f_a$, $f_b$, and $f_c$ present in a bandwidth from $f_c - \Delta f$ to $f_c + \Delta f$ is illustrated. In the example, a time-domain effective gain pattern is indicated by a dashed line, and time-domain effective gain patterns are indicated by $G_{TX}^{fa}(\theta)$, $G_{TX}^{fa}(\theta)$, and at the frequencies $f_a$, $f_b$, and $f_c$, respectively. In addition, B indicates a system bandwidth.

FIGS. 6 through 9 are result graphs obtained from experiments performed under various conditions with a gain variation in relation to a variation in elevation angle. The graphs are analyzed case by case.

Case #01-001 indicates an antenna gain pattern when there is no radiometric compensation performed, and may be represented by the following equation.

$$I_{01\text{-}001}^{IRF}(\theta_W) = f^{-1}\{S_{Rx}(\theta_W, f_{BW}) \cdot H_{Tx}^{ra}(\theta_W, f_{BW})\}$$

Case #01-002 indicates an antenna gain pattern when narrowband radiometric compensation is applied, and may be represented by the following equation.

$$I_{01\text{-}002}^{IRF}(\theta_W) = g_{con.}^{-2}(\theta_W, f_c)_{time} f^{-1} \{S_{Rx}(\theta_W, f_{BW}) \cdot H_{Tx}^{ra}(\theta_W, f_{BW})\}$$

Case #02-001 indicates an antenna gain pattern when radiometric compensation to which a single frequency-domain effective gain pattern is applied is performed in a 200 MHz band, and may be represented by the following equation.

$$I_{02\text{-}002}^{IRF}(\theta_W) = f^{-1}\{G_{sugg.}^{-2}(\theta_c, f_{BW})_{freq} \cdot S_{Rx}(\theta_W, f_{BW}) \cdot H_{Tx}^{ra}(\theta_W, f_{BW})\}$$

Case #02-002 indicates an antenna gain pattern when radiometric compensation to which a single frequency-domain effective gain pattern is applied is performed in a 600 MHz band, and may be represented by the following equation.

$$I_{02\text{-}002}^{IRF}(\theta_W) = f^{-1}\{G_{sugg.}^{-2}(\theta_c, f_{BW})_{freq} \cdot S_{Rx}(\theta_W, f_{BW}) \cdot H_{Tx}^{ra}(\theta_W, f_{BW})\}$$

Case #03-001 indicates an antenna gain pattern when radiometric compensation to a dual frequency-domain and time-domain effective gain pattern is applied is performed in a 200 MHz, band, and may be represented by the following equation.

$$I_{03\text{-}001}^{IRF}(\theta_W) = g_{sugg.}^{-2}(\theta_W, \tilde{f}_{BW})_{time} f^{-1}\{G_{sugg.}^{-2}(\theta_c, f_{BW})_{freq} \cdot S_{Rx}(\theta_W, f_{BW}) \cdot H_{Tx}^{ra}(\theta_W, f_{BW})\}$$

Case #03-002 indicates an antenna gain pattern when radiometric compensation to a dual frequency-domain and time-domain effective gain pattern is applied is performed in a 600 MHz band, and may be represented by the following equation.

$$I_{03\text{-}002}^{IRF}(\theta_W) = g_{sugg.}^{-2}(\theta_W, \tilde{f}_{BW})_{time} f^{-1}\{G_{sugg.}^{-2}(\theta_c, f_{BW})_{freq} \cdot S_{Rx}(\theta_W, f_{BW}) \cdot H_{Tx}^{ra}(\theta_W, f_{BW})\}$$

Hereinafter, the graphs of the cases Case #01-001 through #03-002 will be described in greater detail.

Figure 6:
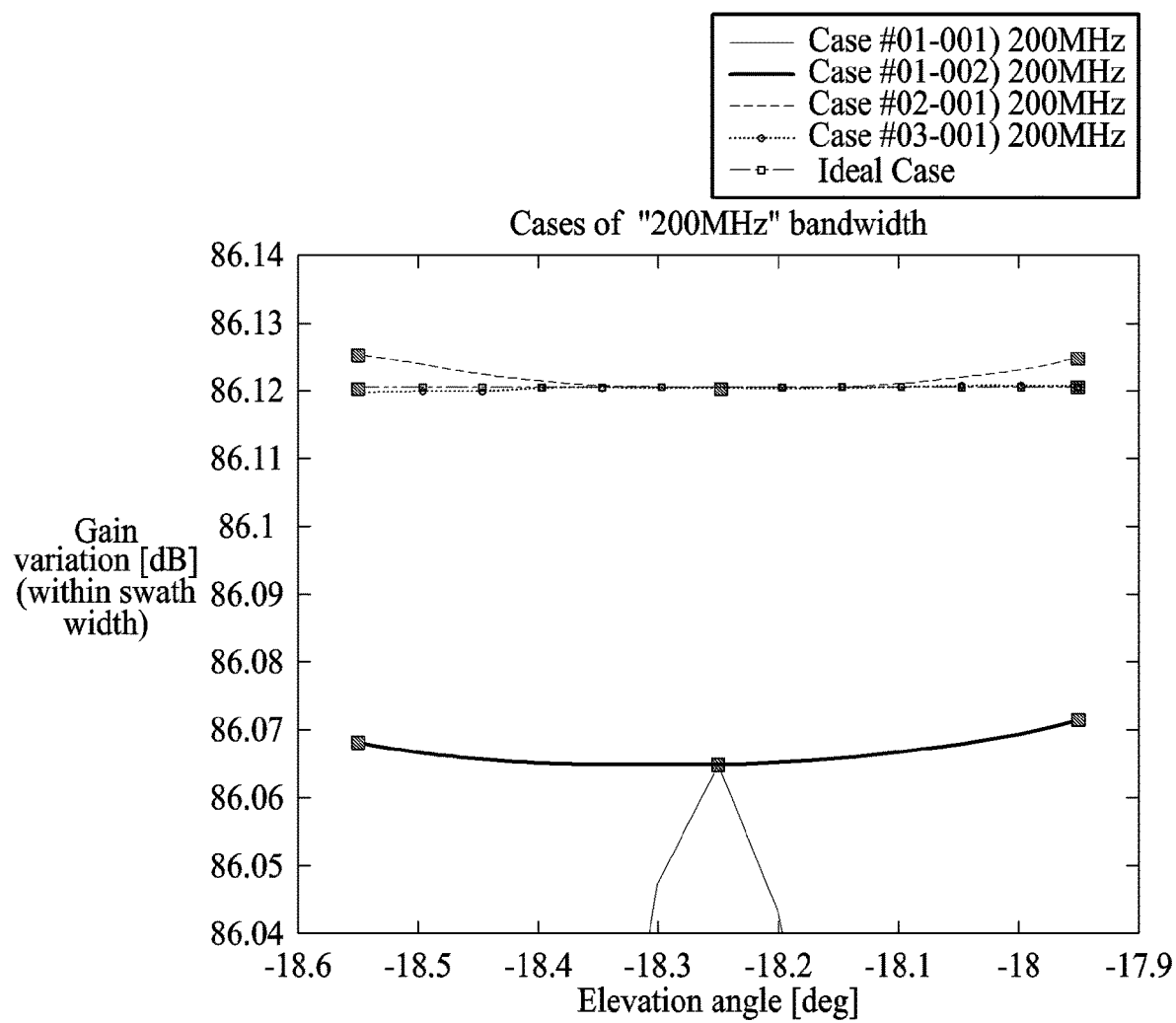
FIG. 6 is a graph illustrating an example of application of an effective gain pattern in a 200 megahertz (MHz) bandwidth according to an example embodiment.

FIG. 6 is a graph illustrating an example of application of an effective gain pattern in a 200 MHz band according to an example embodiment. The graph illustrated in FIG. 6 relates to Case #01-001, Case #01-002, Case #02-001, Case #03-001, and an ideal case, in a narrowband, for example, 200 MHz.

In an ideal case where antenna gain pattern compensation is desirable, a gain variation may be constant at 86.12 in a swath width, despite a variation in elevation angle θ. However, in a case, or Case #01-001, where radiometric compensation is not performed, an antenna gain pattern of a system may be exhibited in an image, dissimilar to the ideal case. An abstract form of the graph indicates an antenna gain pattern, and thus image brightness in the swath width may not be uniform, and accordingly an image quality may be degraded. In a case, or Case #01-002, indicated by a bold solid line where existing narrowband radiometric compensation is performed, or time-domain single compensation is performed, image brightness may be uniform to some extent. However, in such a case, it is verified that an absolute gain difference of approximately 0.05 decibels (dB) occurs.

Hereinafter, the graphs of a case, or Case #02-001, where frequency-domain radiometric compensation is performed in a bandwidth of 200 MHz and of a case, or Case #03-001, where frequency- and time-domain dual radiometric compensation is performed will be described in detail with reference to FIG. 7.

Figure 7:
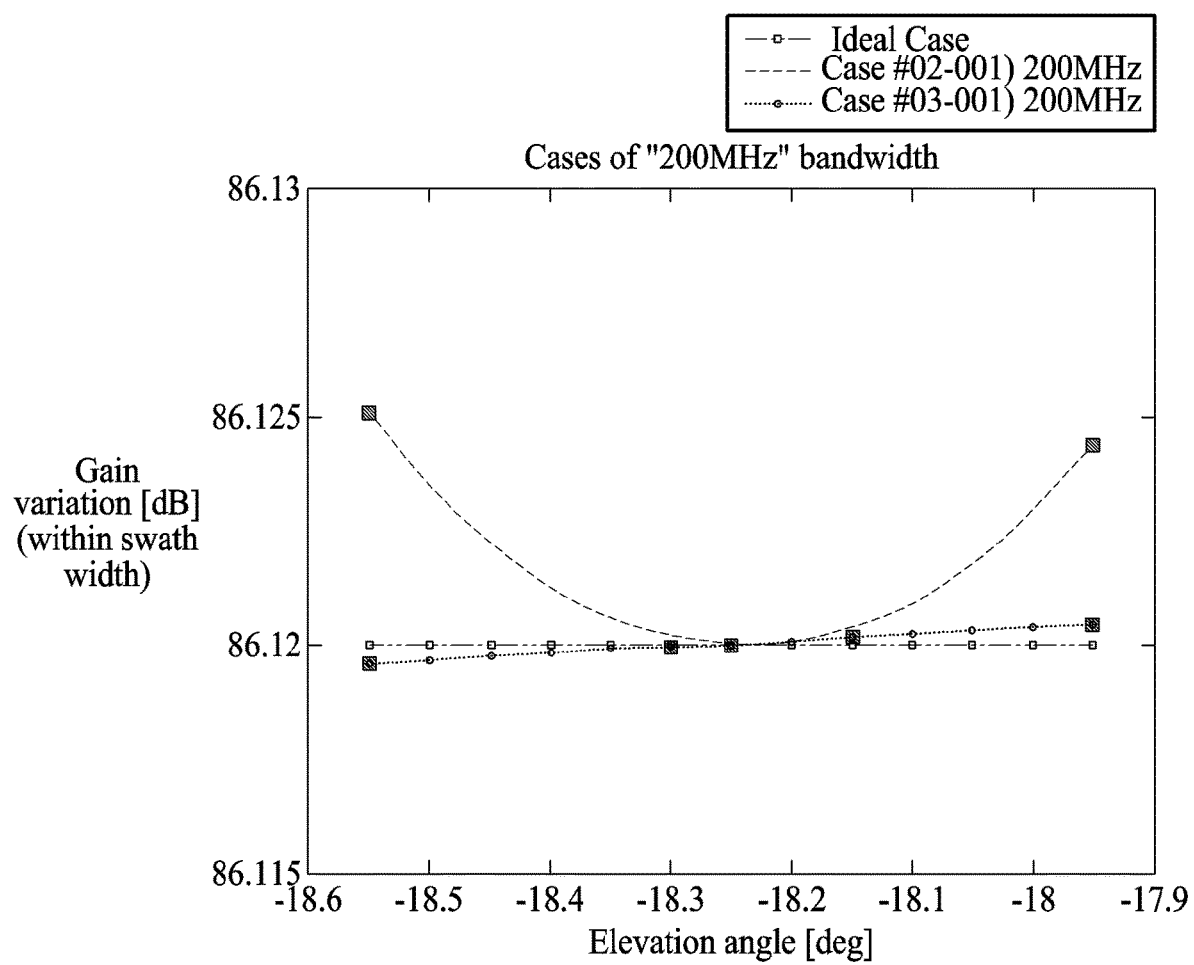
FIG. 7 is a detailed graph illustrating a result of the example illustrated in FIG. 6.

FIG. 7 is a detailed graph indicating a result of the example illustrated in FIG. 6. In a case, or Case #02-001, where frequency-domain single radiometric compensation is performed in a narrowband with a bandwidth of 200 MHz, a gain difference of 0.0534 dB (86.1200-86.0666) may be compensated for and improved, compared to the case, or Case #01-002, indicated by a bold solid line where the existing narrowband radiometric compensation, or the time-domain single radiometric compensation, is performed. In addition, in a case, or Case #03-001, where frequency- and time-domain dual radiometric compensation is performed, an error may be almost the same as that shown in the ideal case. That is, in a narrowband, for example, 200 MHz, it is possible to obtain a significant result only from the frequency-domain single radiometric compensation, and also a significant result that is similar to that from the ideal case may be obtained from the frequency- and time-domain dual radiometric compensation.

An absolute gain difference may be finally compensated for using a calibration constant. However, as an analytical result of performance evaluation of radiometric calibration, accuracy may be improved by 0.0534 dB on average.

Hereinafter, the graphs of the cases associated with a wideband system with a bandwidth of, for example, 600 MHz, will be described with reference to FIGS. 8 and 9.

Figure 8:
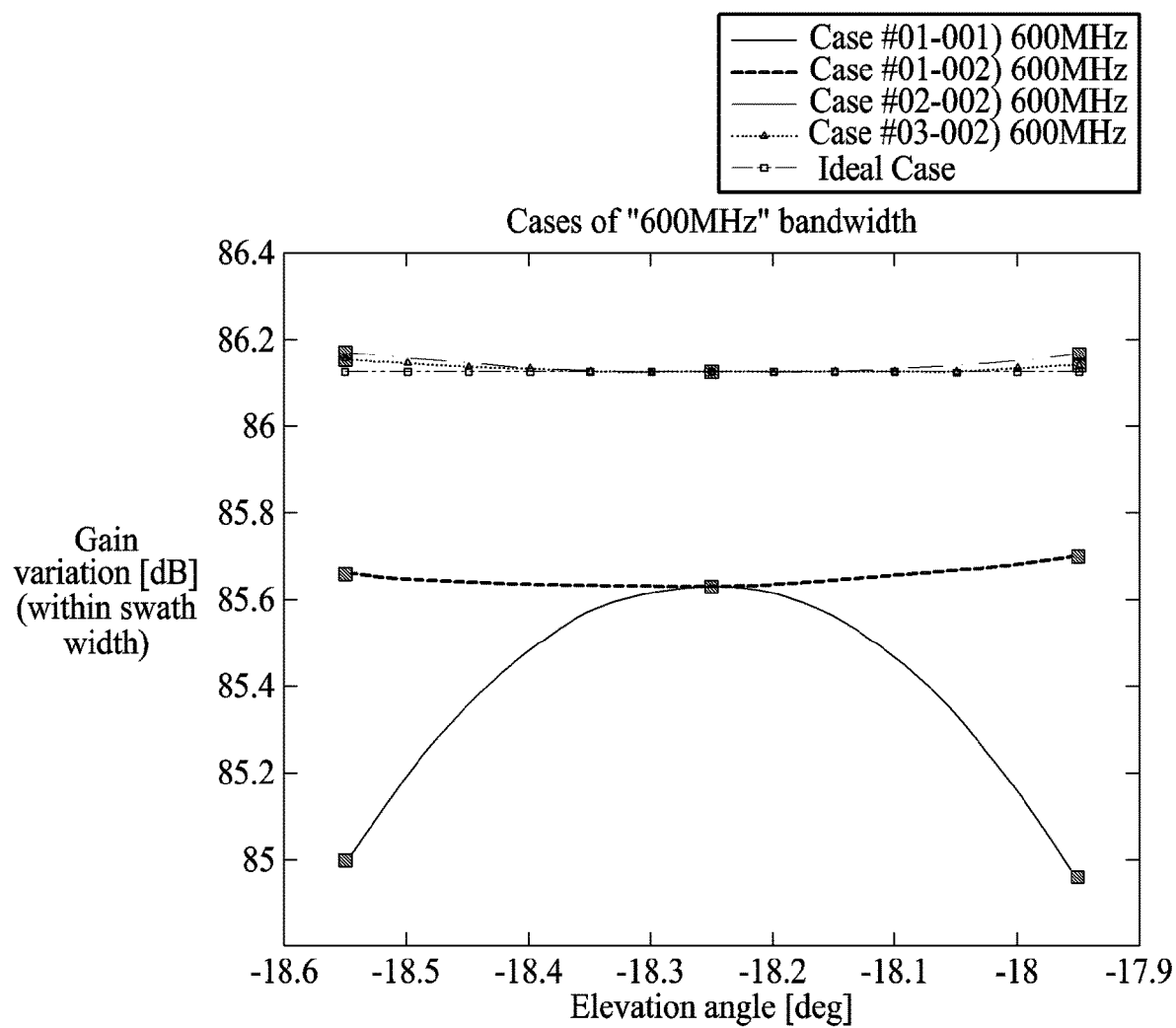
FIG. 8 a graph illustrating an example of application of an effective gain pattern in a 600 MHz bandwidth according to an example embodiment.

FIG. 8 a graph illustrating an example of application of an effective gain pattern in a 600 MHz band according to an example embodiment. The graph illustrated in FIG. 8 relates to Case #01-001, Case #01-002, Case #02-002, Case #03-002, and the ideal case, in a wideband, for example, 600 MHz.

In the ideal case where radiometric calibration is desirably performed, a gain variation may be constant at 86.12 in a swath width despite a variation in elevation angle θ, as shown in the ideal case associated with the narrowband described above with reference to FIGS. 6 and 7. However, in a case, or Case #01-002 indicated by a dashed line, where the existing narrowband time-domain single radiometric compensation is performed, an error of approximately 0.5 dB may occur compared to the ideal case, from which a radiometric quality may be degraded (based on a radiometric accuracy less than or equal to 1 dB). Compared to the case in the narrowband with a bandwidth of 200 MHz where a variation of approximately 0.05 dB occurs, the error may increase by a factor of 10 times.

Hereinafter, the graphs of a case, or Case #02-002, where frequency-domain single radiometric compensation is performed in a bandwidth of 600 MHz and of a case, or Case #03-002, where frequency- and time-domain dual radiometric compensation is performed will be described in detail with reference to FIG. 9.

Figure 9:
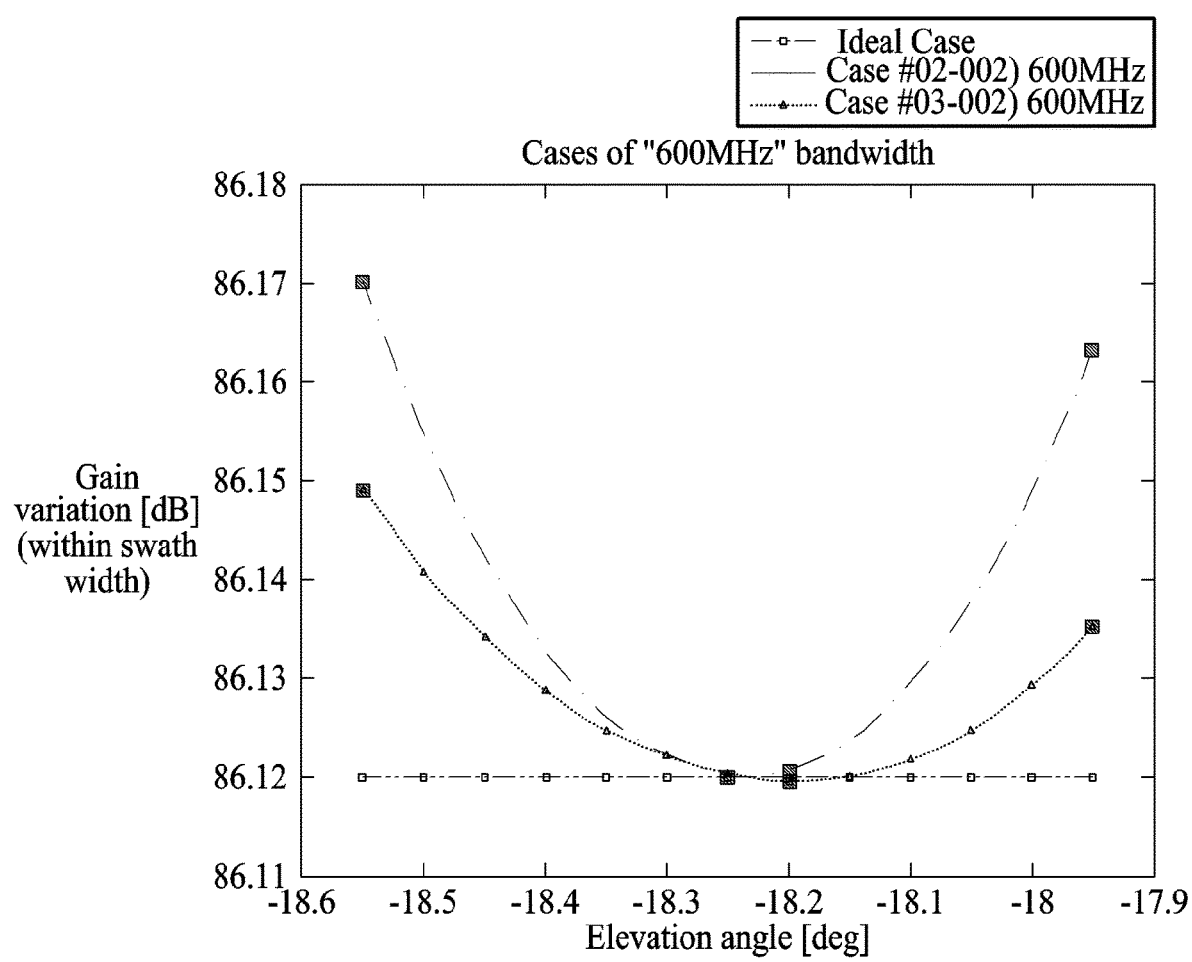
FIG. 9 is a detailed graph illustrating a result of the example illustrated in FIG. 8.

FIG. 9 is a detailed graph illustrating a result of the example illustrated in FIG. 8. In a case, or Case #02-002 indicated by an alternate long and short dash line, where frequency-domain single radiometric compensation is performed, a gain variation may be different by maximally 0.02 dB from that in the ideal case indicated by an alternate long and two short dashes line. In a case where existing time-domain single radiometric compensation is applied to a wideband, for example, 600 MHz, a difference may increase by a factor of approximately 10 times to 0.5 dB. However, by applying the frequency-domain single radiometric compensation to the wideband, a difference may increase by a factor of 3.6 times to 0.023 dB, and thus there may be no concern about degradation of a radiometric quality. In a case, or Case #03-002, where frequency- and time-domain dual radiometric compensation is performed, there may be a difference of approximately 0.013 dB, which is less than that in the case where the frequency-domain single radiometric compensation is performed. Referring to the graphs described above, it is verified that a radiometric quality is improved through the frequency-domain single radiometric compensation and the frequency- and time-domain dual radiometric compensation in the bandwidth of 600 MHz. Thus, through such a frequency-domain single radiometric compensation and such a frequency- and time-domain dual radiometric compensation based on a wideband system, radiometric compensation that satisfies approximately 10% of requirements for 1.00 dB accuracy suitable for designing of an SAR system may be enabled.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating an imaging radar system to produce improved radiometric quality images by compensating an antenna gain pattern wherein the imaging radar system includes a synthetic-aperture radar (SAR) transceiver system communicatively coupled to a radar antenna for transmitting and receiving radio waves having a wide frequency bandwidth in a wideband system and having an antenna gain pattern dependent on frequency variation of wide bandwidth signals in the wideband system, a processor, a non-transitory memory, and computer executable instructions stored within the non-transitory memory for processing by the processor and performing the method, the method comprising in the imaging radar system:

performing frequency-domain compensation on an antenna gain pattern of a first frequency band in the wideband system by multiplying a frequency-domain signal by a function in which a first elevation angle variation in a time domain is applied to antenna gain values in a frequency domain, wherein the function in which the first elevation angle variation in the time domain is applied to the antenna gain values in the frequency domain is an inverse function of a function obtained by performing an integration on a function obtained by multiplying an antenna gain function in the frequency domain by a weighting function in the time domain, within the wideband system.

2. A method of operating an imaging radar system to produce improved radiometric quality images by compensating an antenna gain pattern wherein the imaging radar system includes a synthetic-aperture radar (SAR) transceiver system communicatively coupled to a radar antenna for transmitting and receiving radio waves having a wide frequency bandwidth and having an antenna gain pattern dependent on frequency variation of wide bandwidth signals in a wideband system, a processor, a non-transitory memory, and computer executable instructions stored within the non-transitory memory for processing by the processor and performing the method, the method comprising in the imaging radar system:

performing frequency-domain compensation on an antenna gain pattern of a first frequency band in the wideband system by multiplying a frequency-domain signal by a function in which a first elevation angle variation in a time domain is applied to antenna gain values in a frequency domain; and performing time-domain compensation on the antenna gain pattern by multiplying a time-domain signal by a function in which a first frequency variation in the frequency domain is applied to antenna gain values in the time domain wherein the function in which the first elevation angle variation in the time domain is applied to the antenna gain values in the frequency domain is an inverse function of a function obtained by performing an integration on a function obtained by multiplying an antenna gain function in the frequency domain by a weighting function in the time domain within the wideband system.

3. The method of claim 2, wherein the function in which the first frequency variation in the frequency domain is applied to the antenna gain values in the time domain is an inverse function of a function obtained by performing an integration on a function obtained by multiplying an antenna gain function in the time domain by a weighting function in the frequency domain within the wideband system.

4. The method of claim 1 wherein the imaging radar system performing the method is associated with a satellite.

5. The method of claim 2 wherein the imaging radar system performing the method is associated with a satellite.

6. An apparatus to produce improved radiometric quality images by compensating an antenna gain pattern, wherein the apparatus comprises:

a synthetic-aperture radar (SAR) transceiver communicatively coupled to a radar antenna for transmitting and receiving radio waves having a wide frequency bandwidth and having an antenna gain pattern dependent on frequency variation of wide bandwidth signals in a wideband system; and a processor configured to perform frequency-domain compensation on an antenna gain pattern of a first frequency band in the wideband system by multiplying a frequency-domain signal by a function in which a first elevation angle variation in a time domain is applied to the antenna gain values in a frequency domain, wherein the function in which the first elevation angle variation in the time domain is applied to the antenna gain values in the frequency domain is an inverse function of a function obtained by performing an integration on a function obtained by multiplying an antenna gain function in the frequency domain by a weighting function in the time domain, within the wideband system.

7. The apparatus of claim 6 wherein the apparatus is associated with a satellite.

8. The apparatus of claim 6 wherein the processor is further configured to perform time-domain compensation on an antenna gain pattern by multiplying a time-domain signal by a function in which a first frequency variation in the frequency domain is applied to the antenna gain values in the time domain.

9. The apparatus of claim 8 wherein the function in which the first frequency variation in the frequency domain is applied to the antenna gain values in the time domain is an inverse function of a function obtained by performing an integration on a function obtained by multiplying an antenna gain function in the time domain by a weighting function in the frequency domain, within the wideband system.

10. The apparatus of claim 8 wherein the apparatus is associated with a satellite.

\* \* \* \* \*